Sept. 6, 1966  F. GERAY  3,270,587
FOUR-SPEED HYDROMECHANICAL COMPOUND TRANSMISSION
Filed Oct. 26, 1964  2 Sheets-Sheet 1
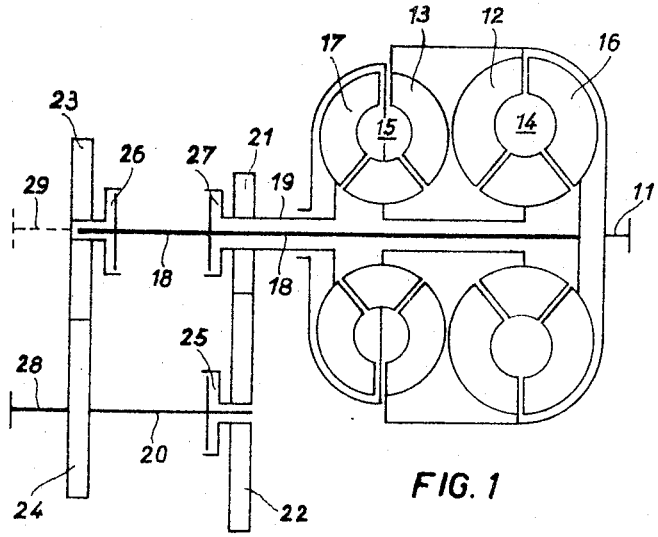
FIG. 1
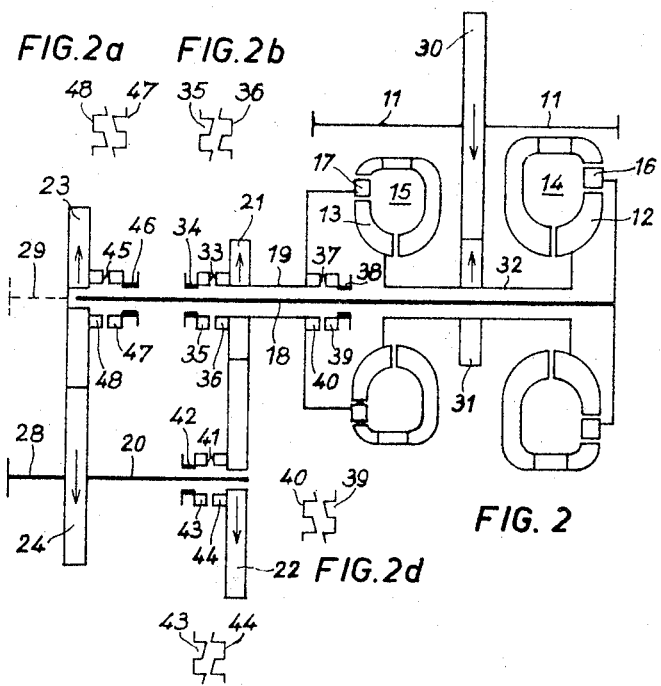
FIG.2a  FIG.2b
FIG. 2
FIG.2c
FIG.2d
INVENTOR
*Franz Geray*
BY
*K. H. Mayr*
ATTORNEY Sept. 6, 1966     F. GERAY     3,270,587
FOUR-SPEED HYDROMECHANICAL COMPOUND TRANSMISSION
Filed Oct. 26, 1964     2 Sheets-Sheet 2
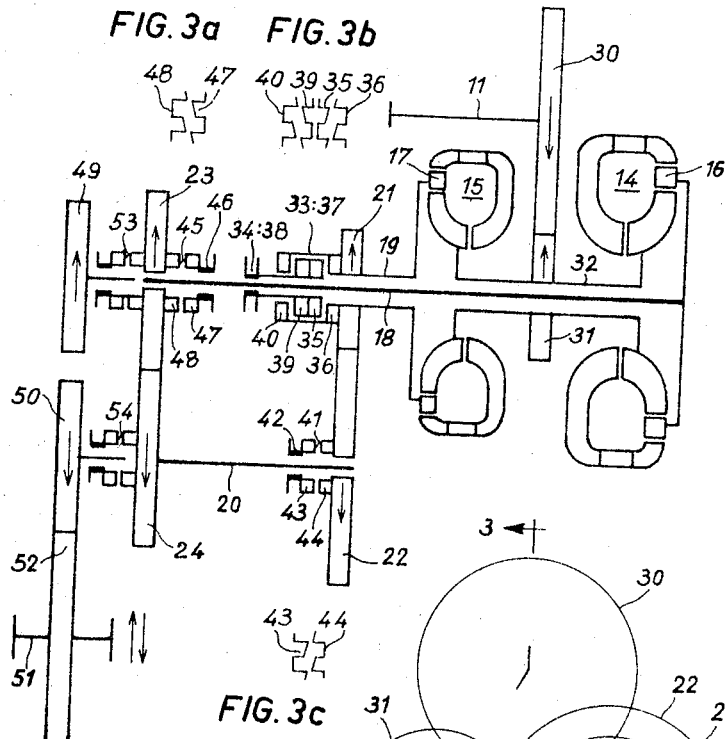
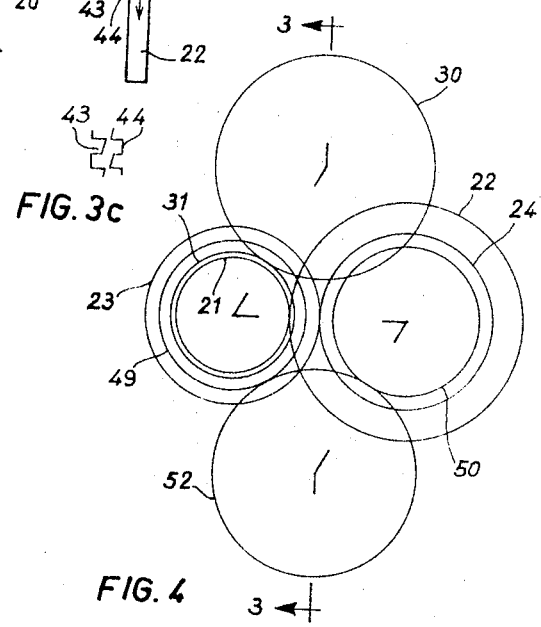
INVENTOR
FRANZ GERAY
BY
ATTORNEY United States Patent Office 3,270,587
Patented Sept. 6, 1966

3,270,587
FOUR-SPEED HYDROMECHANICAL COM-
POUND TRANSMISSION
Franz Geray, Friedrichshafen, Germany, assignor to
Maybach Motorenbau G.m.b.H., Friedrichshafen, Germany, a firm of Germany
Filed Oct. 26, 1964, Ser. No. 406,972
Claims priority, application Germany, Nov. 6, 1963,
M 58,798
5 Claims. (Cl. 74—732)

The present invention relates to a four-speed hydromechanical compound transmission for land vehicles, particularly for motorized rail vehicles, which transmission can be shifted without interrupting traction.

A multistage hydromechanical compound transmission is known which has two parallel power-flow paths which can be cut in and cut out by means of a fluid clutch or a fluid converter in each flow path. One of the flow paths extends from the drive shaft through one of said converters to a first change-speed gear shaft and the second flow path extends through the second converter to a second change-speed gear shaft which is parallel with the first change-speed gear shaft.

In a first embodiment of the aforesaid conventional transmission the two converters are coaxially juxtaposed and their impellers are mounted on a common shaft. The turbine wheel shaft of one converter directly drives the coaxial first change-speed gear shaft. The turbine wheel shaft of the second converter drives the second change-speed gear shaft through a pair of gearwheels. The converters are arranged either in front of the pair of gearwheels and of the change-speed gear or between the pair of gearwheels and the change-speed gear.

In a second embodiment of the conventional transmission one converter is arranged coaxially with the first change-speed gear shaft and the second converter is arranged coaxially with the second, parallel change-speed gear shaft. The drive shaft of the transmission directly drives the impeller of the first converter and drives the impeller of the second converter through a pair of gearwheels. The turbine wheels of both converters directly drive the parallel change-speed gear shafts.

In both aforesaid embodiments a pair of gearwheels is required in front of or after the respective converter in at least one of the two power-flow paths in order to direct this flow path from the drive shaft of the transmission to the second change-speed gear shaft. In a four-speed hydromechanical compound transmission with two pairs of gearwheels in the change-speed gear, at least three pairs of gearwheels are needed in addition to the usually desired step-up gearing at the input side of the transmission for driving the converters at increased speed.

In the embodiment wherein the converters are arranged between the pair of gearwheels and the change-speed gear coaxially of the first change-speed gear shaft and in the embodiment wherein converters are arranged individually coaxially with the parallel change-speed gear shafts, particularly in transmissions with great capacity, because of the necessary dimensions of the converters, the change-speed gear shafts must be placed at a great distance so that large diameter gearwheels are required, making the entire transmission heavy and voluminous.

The present invention relates to a four-speed hydromechanical compound transmission of the aforedescribed type for land vehicles, particularly for motorized rail vehicles, which transmission can be shifted without interrupting traction. The transmission includes two parallel power-flow paths and a controllable hydrodynamic torque converter in each power-flow path. The converters are arranged coaxially at one side of the transmission, the impellers of the converters being jointly driven and the turbine wheels being mounted on two concentric shafts which form the input shafts of the change-speed gear.

The invention resides in the combination of the following features:

(a) One of the two converters is designed for high torque conversion for starting and the second converter has a high efficiency over a broad range at the high speeds;

(b) the change-speed gear has only two pairs of gearwheels, one wheel of the first pair being mounted on one input shaft of the change-speed gear and the second wheel of the first pair being mounted on an additional or countershaft, the second pair of gearwheels having one wheel mounted on the second input shaft of the change-speed gear and having a second wheel mounted on said countershaft;

(c) one of the wheels of each pair of gearwheels is arranged loosely on the respective shaft but can be coupled thereto, the other gearwheels being fixed to their respective shafts;

(d) the two change-speed gear input shafts can be coupled.

The combination of the above-listed features results in a four-speed hydromechanical transmission which can be shifted without interrupting torque and which is of simple construction, of light weight, inexpensive, and requires little space.

A further advantage of the transmission according to the invention and equipped with form-closed shifting clutches in the change-speed gear resides in the fact that when shifting to the next-higher speed or to the next-lower speed the converter to be cut in simultaneously equalizes the speeds of the mating parts of the clutches to be engaged, during the filling operation.

In transmissions according to the invention designed for great power-transmitting capacity and wherein rejecting claw clutches are preferably used as shift clutches, two rejecting claw clutches which reject in opposite directions are arranged for coupling the two change-speed gear input shafts. With this arrangement shifting to the next-higher and next-lower speed can be effected in the same simple manner. The mating parts of the respective rejecting claw clutch are placed adjacent one another, the respective converter is filled and after engagement of the rejecting claw clutch the second converter is emptied and the now not needed rejecting claw clutch is disengaged.

In an embodiment of the invention the two rejecting claw clutches for connecting the two converter output shafts are combined to form a double clutch.

A reversing gear may be connected to the compound transmission according to the invention, the reversing gear having two engaging input wheels to each of which one of two wheels which are individually coaxial with said input wheels and which are not engaged with each other but are engaged with a common output wheel, can be coupled, whereby the first wheel of said engaging input wheels is arranged loosely on the respective input shaft.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a schematic diagram of a transmission incorporating the principles of this invention.

FIG. 2 is a schematic diagram of a transmission having a transmission stage between the input shaft and the converter impellers, and having rejecting claw clutches in the change-speed gear.

FIGS. 2a, 2b, 2c and 2d schematically illustrate claws of the rejecting claw clutches forming part of the mechanism shown in FIG. 2.

FIG. 3 is a schematic diagram of a modified transmission having rejecting claw clutches in the change-speed gear, and a reversing gear.

FIGS. 3a, 3b and 3c schematically illustrate claws of the rejecting claw clutches forming part of the mechanism shown in FIG. 3.

FIG. 4 is a schematic illustration of the arrangement of the gearwheels in the arrangement shown in FIG. 3.

Referring more particularly to FIG. 1 of the drawing, an engine, not shown, drives the impellers 12 and 13 of two hydrodynamic torque converters 14 and 15, respectively, through a drive shaft 11. The converter 14 is designed for starting and is capable of high torque conversion at a steep increase of the efficiency. The converter 15 has a high efficiency over a broad range at higher speed conditions.

The turbine wheel 16 of the converter 14 is mounted on the inner one of two concentric shafts 18 and 19 which are the input shafts of the change-speed gear; the turbine wheel 17 of the converter 15 is mounted on the outer shaft 19.

A first pair of spur gearwheels 21, 22 is mounted on the input shaft 19 and a countershaft 20 and a second pair of spur gearwheels 23, 24 is mounted on the change-speed gear input shaft 18 and the countershaft 20. The drawing shows the wheel 21 as fixed to its shaft 19 and the wheel 22 as loose, i.e. rotatable, on its shaft 20. The wheel 22 can be coupled to the shaft 20 by means of a clutch 25. It is also possible to arrange the wheel 21 as loose wheel and to provide a clutch on the input shaft 19 and to fix the wheel 22 to the shaft 20.

The wheel 23 of the second pair of gearwheels is arranged loose, i.e. rotatable, on the input shaft 18 and connectable thereto by a clutch 26. The wheel 24 is fixed to the shaft 20. A clutch 27 serves for connecting the change-speed gear input shafts 18 and 19. The output shaft of the transmission may be formed by an elongation 28 of the shaft 20 or may be formed by a shaft 29 connected to the wheel 23.

If the shaft 28 is used as output shaft of the transmission the wheel 23 of the second pair of gearwheels may be fixed to the change-speed gear input shaft 18 and the wheel 24 may be loose on but connectable by a clutch to the shaft 20.

By means of an additional shaft, not shown, provided, for example, with a fixed wheel which engages with the wheel 22, and a loose wheel which engages with wheel 23 and a clutch for the last-mentioned loose wheel, reverse motion can be effected in a simple manner.

At each speed only one converter is in operation, i.e. the converter 14 at the first and third speed and the converter 15 at the second and fourth speed. The converters are cut in and out by filling and emptying.

The first pair of gearwheels 21, 22 with the shaft 28 as output shaft forms the first stage in the mechanical change-speed gear for the first and second speed, the second gearwheel pair 23, 24 forms the second stage for the third and fourth speed. The following tabulation shows the elements of the power-flow paths at the various speeds:

Speed I—11–14–18–27–21, 22–25–20–28;
Speed II—11–15–19–21, 22–25–20–28;
Speed III—11–14–18–26–23, 24–28;
Speed IV—11–15–19–27–18–26–23, 24–28.

If the shaft 29 forms the output shaft, the pairs of gearwheels 21, 22 and 23, 24 form the first stage for the first and second speed. At third and fourth speed power flows directly from the converters 14 and 15 to the output shaft 29. The following tabulation shows the elements of the power-flow paths in the arrangement using the shaft 29 as output shaft:

Speed I—11–14–18–27–21, 22–25–20–24, 23–29;
Speed II—11–15–19–21, 22–25–20–24, 23–29;
Speed III—11–14–18–26–29;
Speed IV—11–15–19–27–18–26–29.

In order to shift the compound transmission to a next-higher or next-lower speed, power flow is changed from one path to the second path by filling the converter of the path to be cut in and emptying the converter of the power-flow path to be cut out. Interruption of the traction is avoided by emptying the converter of the power-flow path to be cut out not before the converter of the power-flow path to be cut in is almost or completely filled.

Clutches of any suitable conventional type may be used in the change-speed gear.

When using force-locking clutches in the change-speed gear the respective clutch is engaged, the respective converter is filled and the converter which was filled is emptied and the clutches which were previously engaged and which are not needed are disengaged. Each clutch is actuated only when unloaded because power is transmitted through the arrangement for the previous speed until the respective converter is filled.

If form-locking clutches are used in the change-speed gear, they are preferably provided with locking means which prevents engagement before the speeds of the two mating clutch halves are alike. For equalizing the speeds of the mating clutch halves the respective converter is used. For shifting to the desired speed, the respective clutch half is placed adjacent its mating half and the respective converter is filled and the clutch half is accelerated during the filling operation. At equal speed of the two clutch halves the locking means is unlocked and the clutch is engaged. When the converter is filled it transmits power which is transmitted through the just engaged clutch, i.e. at the now desired speed. Thereafter the other converter is emptied and the unloaded clutch of the previous speed is disengaged. Since the converter to be cut in must accelerate only unloaded shafts and wheels during the synchronizing period, the time required for shifting is extremely short.

Operating schedule for transmissions according to FIG. 1, having form-locking clutches:

| | |
|---|---|
| Shifting from speed 0 to I | Engaging clutches 25 and 27, filling converter 14; |
| Shifting from speed I to II | Filling converter 15, emptying converter 14, disengaging clutch 27; |
| Shifting from speed II to III | Placing halves of clutch 26 adjacent one another, filling converter 14, allowing engagement of clutch 26, emptying converter 15, disengaging clutch 25; |
| Shifting from speed III to IV | Placing halves of clutch 27 adjacent one another, filling converter 15, allowing engagement of clutch 27, emptying converter 14; |
| Shifting from speed IV to III | Filling converter 14, emptying converter 15, disengaging clutch 27; |
| Shifting from speed III to II | Placing halves of clutch 25 adjacent one another, filling converter 15, allowing engagement of clutch 25, emptying converter 14, disengaging clutch 26; |
| Shifting from speed II to I | Placing halves of clutch 27 adjacent one another, fililng converter 14, allowing engagement of clutch 27, emptying converter 15. |

FIG. 2 shows an embodiment of the transmission having a step-up gear for driving the pump impellers at higher speed and having rejecting claw clutches as shift clutches in the change-speed gear. This embodiment is particularly suitable for great loads.

In order to provide the shifting method according to the invention which is alike for all speeds and very simple, two rejecting claw clutches having different rejecting directions are provided instead of a single shifting clutch for connecting the two change-speed gear input shafts.

The speed-step-up gear comprises a pair of gear-wheels 30, 31 operatively interposed between the transmission drive shaft 11 and an impeller shaft 32 which is common to both converters 14 and 15. For connecting the two transmission input shafts a rejecting claw clutch 33 is provided for the first speed which claw clutch comprises a sleeve 34 axially movable on the input shaft 18 and having claws 35 and which comprises claws 36 which are rigidly connected to the transmission input shaft 19. The connection between the two transmission input shafts for the fourth speed comprises a rejecting claw clutch 37 including a sleeve 38 which is axially movable and rotatable on the input shaft 18 and is provided with claws 39 designed for a direction of rejection opposite the direction of rejection of the clutch 33. The clutch 37 comprises claws 40 which are rigidly connected to the transmission input shaft 19.

For connecting the gearwheel 22 to the countershaft 20 for the first and second speed a rejecting clutch 41 is provided which consists of a sleeve 42 provided with claws 43 and claws 44 rigidly connected to the wheel 22. For connecting the wheel 23 to the transmission input shaft 18 for the third and fourth speed, a rejecting clutch 45 is provided which includes a sleeve 46 axially movable on and connected to the transmission input shaft 18 to rotate therewith and having claws 47 which fit into gaps between claws 48 which are rigidly connected to the wheel 23.

In the preferred embodiment of the transmission which is shown in FIG. 3 the two rejecting claw clutches 33 and 37 of the embodiment shown in FIG. 2 for connecting the two change-speed gear input shafts are combined to form a double clutch 33–37 having a sleeve 34–38 axially movable on and connected to the transmission input shaft 18 for rotation therewith. The sleeve 34–38 is provided with claws 35, 39. The counterclaws 36 and 40 of the double clutch 33–37 are rigidly connected to the transmission input shaft 19.

For actuating the transmission having rejecting claw clutches the respective clutch half is made ready for engagement by laying the axially movable clutch half on the mating clutch half, the respective converter is filled and accelerates the clutch half during the filling process until the axially movable clutch half engages the mating clutch half when the speeds of rotation of the two clutch halves become equal. After completion of filling of the converter the load is transmitted through the just engaged rejecting claw clutch, i.e. the load is transmitted through the change-speed gear for the respective speed. Thereafter the other converter is emptied and the unloaded claw clutch of the preceding speed is disengaged.

Operating schedule for transmissions according to FIGS. 2 and 3 provided with rejecting claw clutches:

| | |
|---|---|
| Shifting from speed O to I | Placing claws 35 of clutch 33 adjacent claws 36 and placing claws 43 of clutch 41 adjacent claws 44, filling converter 14, whereby shaft 18 begins to rotate, clutch 33 engages immediately, wheels 21 and 22 begin to rotate, and clutch 41 engages immediately; |
| Shifting from speed I to II | Filling converter 15, emptying converter 14, disengaging clutch 33; |
| Shifting from speed II to III | Placing claws 47 of clutch 45 adjacent claws 48, filling converter 14 whereby clutch 45 engages, emptying converter 15, and disengaging clutch 41; |
| Shifting from speed III to IV | Placing claws 39 of clutch 37 adjacent claws 40, filling converter 15 whereby clutch 37 engages, and emptying converter 14; |
| Shifting from speed IV to III | Filling converter 14, emptying converter 15, and disengaging clutch 37; |
| Shifting from speed III to II | Placing claws 43 of clutch 41 adjacent claws 44, filling converter 15 whereby clutch 41 engages, emptying converter 14, and disengaging clutch 45; |
| Shifting from speed II to I | Placing claws 35 of clutch 33 adjacent claws 36, filling converter 14 whereby clutch 33 engages, and emptying converter 15. |

Since at each shifting operation the converter which is filled equalizes the speeds of the mating parts of the claw clutch to be engaged, the same simple operations are required for all shiftings for increasing or decreasing speed, namely, placing the axially movable part of a rejecting claw clutch adjacent the complementary part, filling converter, emptying a converter, disengaging a rejecting claw clutch, if required. The compound transmission according to the invention may therefore be provided with an automatic shifting device which is simple and reliable.

When using the compound transmission in vehicles which are equally operable in both directions of movement, for example in motorized rail vehicles, the gearwheels 23, 24 of the second pair of gearwheels may serve as input wheels of a subsequent reversing gear. As shown in FIG. 3, the reversing gear comprises two additional gearwheels 49 and 50 which do not mesh and are arranged coaxially of the wheels 23 and 24, respectively. The wheels 49 and 50 both mesh with an output wheel 52 which is fast on the transmission output shaft 51. The clutches 53 and 54 which can be actuated when the vehicle stands still, afford clutching of the wheels 49 and 50 to the wheels 23 and 24, respectively, for effecting either one or the opposite direction of rotation of the transmission output shaft 51, depending on whether the clutch 53 or 54 is engaged.

I claim:
1. A four-speed hydromechanical compound transmission for vehicles, including:
  two juxtaposed coaxially placed controllable hydrodynamic torque converters,
  each of said converters having an impeller,
  means for jointly driving said impellers,
  two concentric shafts,
  each of said converters having a turbine wheel, the turbine wheel of one of said converter being mounted on one of said shafts, the turbine wheel of the second converter being mounted on the second of said shafts,
  one of said converters being capable of high-torque conversion for starting, the second converter having a high efficiency over a broad range at high speeds,
  a countershaft,
  a first spur gear pair having a gearwheel mounted on one of said concentric shafts, said first spur gear pair having a second gearwheel mounted on said countershaft,
  a second spur gear pair having one gearwheel mounted on the second concentric shaft, said second spur gear pair having a second gearwheel mounted on said countershaft,
  one gear wheel of each of said spur gear pairs being rotatable on the respective shaft and the other gearwheel of each of said spur gear pairs being made fast on the respective shaft,
  a clutch operatively interposed between each of said gearwheels which are rotatable on the respective shafts, and the respective shaft for selectively clutching said gearwheels to the respective shafts, and
  clutch means operatively interposed between said concentric shafts for clutching and declutching said concentric shafts.

2. A transmission as defined in claim 1 wherein said last-mentioned clutch means comprises two rejecting claw clutches, one of said claw clutches being rejective in one direction of rotation and the second of said claw clutches being rejective in the opposite direction of rotation.

3. A transmission according to claim 2 wherein said two rejecting claw clutches form a double clutch unit.

4. A four-speed hydromechanical compound transmission for vehicles, including:
  two juxtaposed coaxially placed controllable hydrodynamic torque converters,
  each of said converters having an impeller,
  means for jointly driving said impellers,
  two concentric shafts, each of said converters having a turbine wheel, the turbine wheel of one of said converters being mounted on one of said shafts, the turbine wheel of the second converter being mounted on the second shaft, one of said converters being capable of high-torque conversion for starting, the second converter having a high efficiency over a broad range at higher speeds, a countershaft, a first spur gear pair having one gearwheel fast on one of said concentric shafts, said first spur gear pair having a second gearwheel rotatable on said countershaft, a second spur gear pair having a first gearwheel rotatable on the second concentric shaft, said second spur gear pair having a second gearwheel fast on said countershaft, a clutch operatively interposed between each of said gearwheels which are rotatable on the respective shafts, and the respective shaft for clutching said gearwheels to and from the respective shafts, clutch means operatively interposed between said concentric shafts for clutching and declutching said concentric shafts, a third gear wheel placed coaxially of said first gearwheel of said second spur gear pair, and a clutch for selectively connecting and disconnecting said third gearwheel to and from said first gearwheel of the second spur gear pair, a fourth gearwheel placed coaxially of said second gearwheel of said second spur gear pair, and a clutch for selectively connecting and disconnecting said fourth gearwheel to and from said second gearwheel of said second spur gear pair, and a fifth gearwheel permanently engaged with said third and said fourth gearwheel and forming the output gearwheel of the transmission.

5. A transmission as defined in claim 4 wherein the diameters of said gearwheels of said second spur gear pair are equal and wherein the diameters of said third and fourth gearwheels are equal.

References Cited by the Examiner

UNITED STATES PATENTS

| | | | |
|---|---|---|---|
| 2,897,690 | 8/1959 | Maier | 74—732 |
| 3,159,054 | 12/1964 | Gros | 74—732 |
| 3,159,055 | 12/1964 | Schweizer | 74—732 |
| 3,164,232 | 1/1965 | General | 74—732 |

DAVID J. WILLIAMOWSKY, *Primary Examiner.*

R. F. HESS, *Assistant Examiner.*